Figure 1:
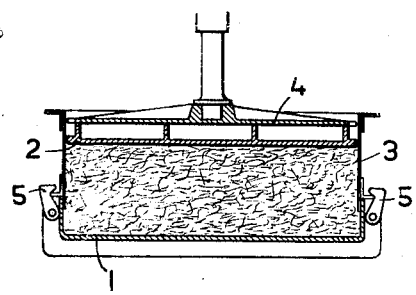

April 3, 1934.  K. ERDMANN  1,953,704
APPARATUS FOR MANUFACTURING POROUS BODIES FROM FIBROUS MATERIALS
Filed May 7, 1931  2 Sheets-Sheet 1

April 3, 1934.   K. ERDMANN   1,953,704
APPARATUS FOR MANUFACTURING POROUS BODIES FROM FIBROUS MATERIALS
Filed May 7, 1931   2 Sheets-Sheet 2
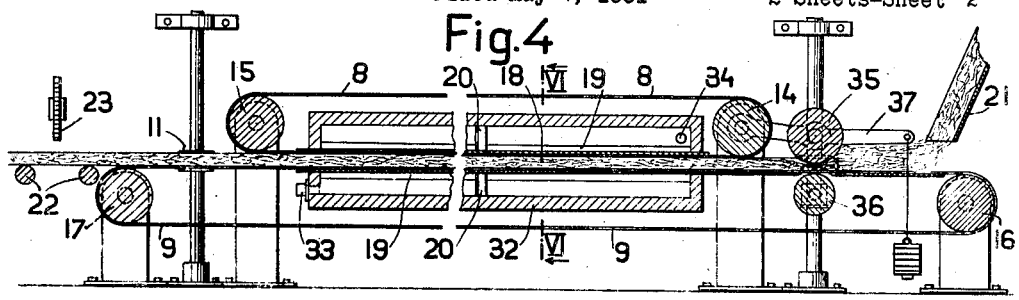
Fig.4
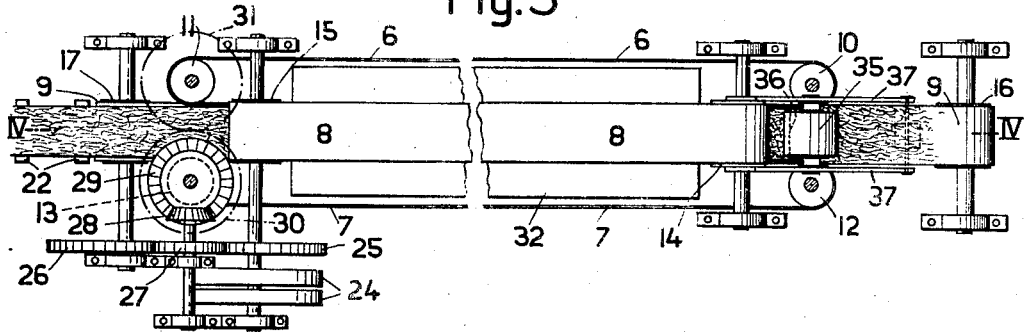
Fig.5
Fig.6
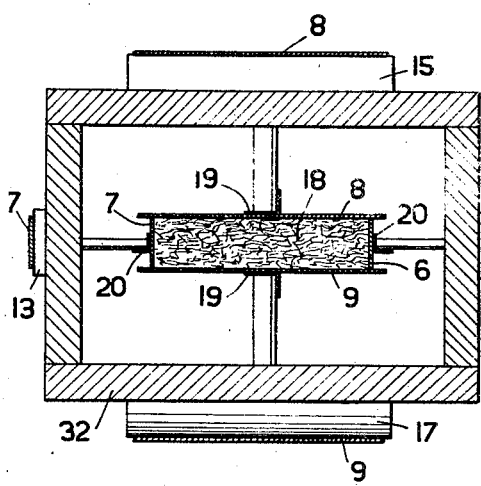
Fig.7
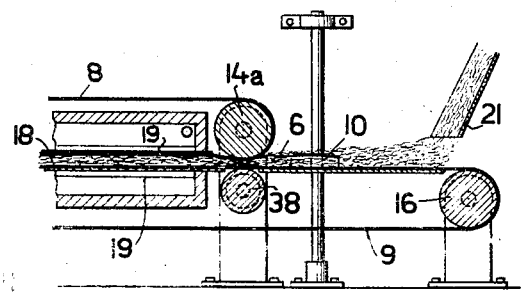
Fig.8
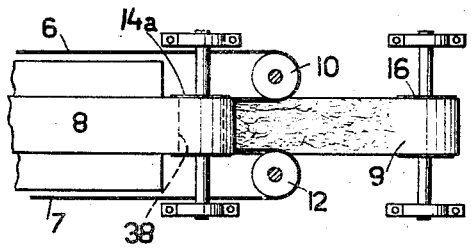
K. Erdmann
INVENTOR
By: Marks & Clerk
ATTYS.

Patented Apr. 3, 1934

1,953,704

UNITED STATES PATENT OFFICE 1,953,704

APPARATUS FOR MANUFACTURING POROUS BODIES FROM FIBROUS MATERIALS

Konrad Erdmann, Radenthein, Karnten, Austria

Application May 7, 1931, Serial No. 535,760
In Austria June 2, 1930

4 Claims. (Cl. 25—42)

The invention relates to the manufacture of porous bodies from fibrous materials cemented together by suitable binding agents, and particularly to the manufacture of light building plates from wood wool united and hardened by means of the so-called sorel cement.

In the usual method of manufacturing such plates the loose wood wool soaked in and impregnated with sorel cement is stuffed into molds of desired dimensions and hardened by the action of heat. As the mass stuffed into the molds by applying pressure, still possesses a relatively high degree of elasticity, a considerable pressure is exerted during the binding process on the walls of the mold and for this reason strong molds have to be used. This involves higher costs of the molds and furthermore shows also the drawback that a considerable amount of heat applied for causing the hardening of the mass is absorbed by the walls of the mold. Moreover also the handling of such relatively heavy molds is more tiresome.

These disadvantages are avoided by the method and the apparatus according to the present invention. This method essentially consists in compressing the fibrous mass to a volume, which is smaller than that corresponding to the capacity of the mold, the elasticity of the material being thereby destroyed to such an extent that there is shown nearly no more tension after the mass having expanded to the capacity of the mold. Consequently the pressure exerted by the mass on the walls of the molds is in this manner considerably diminished, so that molds with relatively thin walls can be used.

Instead of employing closed molds the molding may also be effected in a continuous manner by first forming from the soaked loose material a continuous body, which may be called a hank or band, hardening this band to a sufficient degree and then cutting off therefrom plates of the desired length. This way of proceeding may be carried out by means of a machine, such as is for instance described and shown in my U. S. A. Patent No. 1,593,163.

If the method according to the present invention is applied to the mode of forming the band by means of a machine of this kind the advantage is obtained that the pressure on the rails supporting the forming straps and consequently also the friction between these straps and their guiding rails is considerably diminished.

In the annexed drawings a mold and a machine adapted for carrying the invention into practice are illustrated by way of example.

Figure 2:
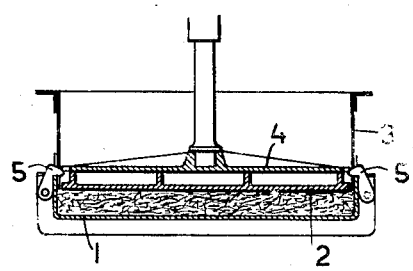
Figure 3:
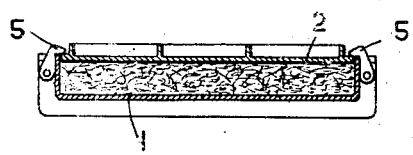

The Figures 1 and 2 show by sectional elevations the mold with a filling device in two different stages of procedure, Fig. 3 shows the mold when filled. Fig. 4 is a sectional elevation of a band forming machine of the above mentioned kind on the line IV—IV of Fig. 5. Fig. 5 is a plan view of the machine, Fig. 6 a cross-section on the line VI—VI of Fig. 4 at an enlarged scale, Fig. 7 a sectional elevation of parts of a modified form of the machine and Fig. 8 a plan view of the parts shown in Fig. 7.

The mold shown by Figures 1 to 3 consists of the rectangular, box-like base-part 1 and the cover 2 provided with reinforcing webs. The dimensions of the cover are such, that it can slide in the box 1 in the manner of a piston. On top of the box 1 a removable filling frame or hopper 3 is placed.

The soaked loose fibrous material is then filled into the hopper 3 nearly up to the borders of the hopper and the cover placed within the hopper on top of the fibrous material. Now the cover is pressed down, for instance by means of the die 4 of a press not shown. The compression is continued until the cover will have reached the position as shown by Fig. 2, that is considerably below the borders of the box 1. Now the hooks 5 provided on the side walls of the box 1 are turned so as to come within the path of the cover. Then the die 4 is lifted and the hopper 3 removed. The resilient fibrous material will now expand until the outer surface of the released cover will engage with the hooks 5. When the cover has reached this position, the tension of the fibrous material will have disappeared nearly entirely, so that the pressure, to which the walls of the mold are now exposed, is very small.

In the Figures 4, 5 and 6 illustrating a band forming machine of the above mentioned type the reference numerals 6, 7 and 8, 9 designate four endless steel straps running over the rollers 10, 11, 12, 13 and 14, 15, 16, 17. The sides (flights) running off from the rollers 10, 12, 14 and 16 enclose a rectangular channel 18, the cross-section of which corresponds to that of the plate to be made. The straps 8 and 9 are broader than the distance between the inner parts of the straps 6, 7 whilst the breadth of the straps 6, 7 is equal to the distance of the inner surfaces of the inner parts of the straps 8 and 9. These steel straps are guided by rails 19, 19, 20, 20 made of angle bars. At the entry as well as on the end of the channel the strap 9 extends beyond the length of the channel and its part before the entry of the channel, running below the chute 21, acts as a feeding device, conveying in an uninterrupted stream the loose fibrous material, sliding off the chute 21, into the channel 18. The other end acts as a discharge conveyer and as transporting device for conveying the formed hank on to a series of rollers 22 serving as a path-way. By means of a saw 23 or the like the hank is cut into plates.

For driving the steel straps pulleys 24 are mounted on the shaft of the roller 15, which by means of the gear 25, 26 drive the roller 17. With the cog-wheel 26 engages a toothed wheel 27, the rotation of which is by means of the bevel gear wheels 28, 29 and the spur wheels 30, 31 transferred to the rollers 10, 11, 12, 13.

In order to accelerate the hardening of the impregnating mass during the time the hank passes the channel 18 a chamber 32 is provided, which surrounds the said channel from all sides. In the front wall as well as in the back wall of this chamber apertures are provided, through which the straps pass, the area of these apertures being that of the cross-section of the channel, so that the interior of the chamber is fully shut off from the outside air. The air within the chamber may be heated by electric or other means, for instance by hot gases entering at 33 and escaping at 34.

For effecting the surplus of compression according to the present invention a pair of rollers 35 and 36 is arranged between the feeding rollers 14 and 16 so that the lower roller 36 touches the strap 9. The upper roller 35 is rotatably mounted in a lever 37 loaded by a weight. By the suitably chosen load of the upper roller the hank of fibrous material passing between the rollers 35, 36 is compressed to such a degree, that its thickness at the place of compression is considerably smaller than the distance in the binding chamber between the straps 8 and 9. As soon as the hank has left the compression rollers 35, 36 the fibrous material begins to expand again. The compression is chosen such that the thickness of the expanded hank is only a little greater than the distance of the straps 8 and 9 within the binding chamber. The pressure exerted by the fibrous mass on these straps and by the latter on their guiding rails 19, 20 is therefore only very small. In this manner the friction between straps and guiding rails and consequently also the wear of these parts as well as the amount of power required for driving the straps is considerably diminished.

In a modified form of the machine as illustrated by Figures 7 and 8 a roller 14a mounted in fixed bearings is used as compressing member. This roller coacts with a roller 38 supporting the straps 9, and is disposed so low that the distance of its mantle surface from the strap 9 is considerably smaller than the distance between the straps 8 and 9. The hank of fibrous material is thus compressed at the place between the rollers 14a and 38 in the same manner as has been described above for the rollers 35, 36 of Fig. 4.

In order to allow the hank to expand, the strap 8 runs a little more loosely round its guiding rollers, so that it can give way upwardly in its non-supported part between the roller 14a and the guiding rail 19.

What I claim is:

1. In a forming machine which consists of conveying straps forming a channel, a pair of compression rollers disposed in front of the channel.

2. In a forming machine which consists of conveying straps forming a channel, a pair of compression rollers disposed in front of the channel and so arranged that the distance between the mantle surfaces of the rollers is smaller than the height of the channel.

3. In a forming machine which consists of conveying straps forming a channel, a pair of compression rollers disposed in front of the channel one of which is mounted in a lever loaded by a weight, the two rollers being so arranged that the distance between the mantle surfaces of the rollers is smaller than the height of the channel.

4. In a forming machine which consists of conveying straps forming a channel, a pair of compression rollers disposed in front of the channel one of the rollers being the guiding roller for one of the straps, the two rollers being so arranged that the distance between the mantle surfaces of the rollers is smaller than the height of the channel.

KONRAD ERDMANN.